United States Patent Office 3,407,210
Patented Oct. 22, 1968

3,407,210
AMINOETHYL-BENZOFURANS AND DERIVATIVES THEREOF
Wolfgang Schoetensack, Constance, Guenther Hallmann, Limburgerhof, Pfalz, and Karl Haegele, Hilzingen, Kreis Constance, Germany, assignors to Byk-Gulden Lomberg Chemische Fabrik G.m.b.H., Constance, Germany, a corporation of Germany
No Drawing. Filed Nov. 2, 1962, Ser. No. 235,129
Claims priority, application Germany, Nov. 3, 1961, B 64,655, B 64,656
25 Claims. (Cl. 260—326)

The present invention relates to new and valuable benzofuran compounds and more particularly to 3-($\beta$-aminoethyl)benzofuran compounds which may be substituted, to acid addition salts of such compounds, and to a process of making and using same.

It is one object of the present invention to produce new and valuable 3-($\beta$-aminoethyl)benzofuran compounds which may be substituted, and their acid addition salts.

Another object of the present invention is to provide simple and effective methods of producing such 3-($\beta$-aminoethyl)benzofuran compounds and acid addition salts thereof.

A further object of the present invention is to provide new and valuable pharmaceutical 3-($\beta$-aminoethyl)benzofuran compounds with noteworthy pharmacological properties.

Still another object of the present invention is to provide pharmaceutical compositions containing such new and valuable 3-($\beta$-aminoethyl)benzofuran compounds and their acid addition salts.

Other objects of the present invention and advantageous features thereof will become apparent as the description proceeds.

In principle, the compounds according to the present invention are 3-($\beta$-aminoethyl)benzofuran compounds of the following formula:

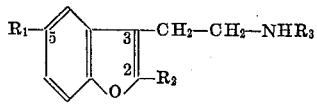

I

In said formula
$R_1$ indicates an alkoxy, preferably a lower alkoxy group such as the methoxy group, an aralkoxy group, preferably the benzyloxy group, an aralkyl radical, preferably the benzyl radical or the benzhydryl radical, hydrogen, halogen, preferably chlorine, bromine and iodine, the hydroxyl group, the nitro group, the amino group, an alkylamino group, preferably a lower alkylamino group, an aralkylamino group, preferably the benzylamino group, or an alkyl radical with 1 to 5 carbon atoms, which may further be substituted;
$R_2$ indicates hydrogen, an alkyl radical having 1 to 5 carbon atoms, or the phenyl radical, which alkyl or phenyl radicals may be substituted; and
$R_3$ indicates hydrogen, the residue of an aliphatic carboxylic acid, preferably an aliphatic carboxylic acid with 1 to 5 carbon atoms, or the residue of an aromatic carboxylic acid, preferably a phenyl carboxylic acid, which carboxylic acid residues may be substituted.

Such 3-($\beta$-aminoethyl)benzofuran compounds are prepared, for instance, by starting with a corresponding benzofuryl-3-propionic acid of Formula II

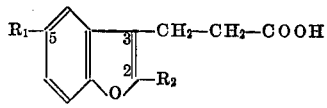

II or a reactive derivative thereof, wherein $R_1$ and $R_2$ represent the same substituents as indicated hereinabove and converting said acid according to methods known per se into the corresponding benzofuryl-3-propionyl hydrazide. This reaction may be carried out first by producing the lower alkyl ester, for instance, the methyl ester of said acid according to conventional esterification methods, or by preparing the corresponding benzofuryl-3-propionyl chloride according to methods known per se and then converting said esters or chloride into the hydrazide. This conversion can be carried out without difficulty and with a good yield and isolation of the hydrazide can readily be effected.

The resulting benzofuryl-3-propionyl hydrazide is subsequently converted into the corresponding benzofuryl-3-propionyl azide by a treatment with nitrous acid according to known methods. The azide need not be isolated but can directly be reacted and converted into the corresponding benzofuryl-3-($\beta$-aminoethyl)-N-carboxylic acid ester by reacting the solution of the acid azide in benzene with a lower aliphatic alcohol such as methanol or ethanol. Isolation and purification of said benzofuryl-3-($\beta$-aminoethyl)-N-carboxylic acid esters can be effected without difficulty.

The resulting urethane compounds are saponified either directly to the corresponding benzofuryl-3-ethylamines or they are first converted into the corresponding benzofuryl-3-($\beta$-phthalimidoethyl) compounds, for instance, by reaction with a reactive acid derivative such as phthalic acid anhydride. This process has the advantage that the resulting phthalimido compound is obtained in a high yield and can readily and advantageously be purified. Subsequent hydrolysis of the phthalimido compound, for instance, with hydrazine hydrate yields the corresponding benzofuryl-3-($\beta$-aminoethyl) compound in a high yield. Said compound can be isolated in the form of its salt, if desired.

Acylation of said benzofuryl-3-($\beta$-aminoethyl) compounds in a manner known per se, for instance, with aliphatic carboxylic acids containing 1 to 5 carbon atoms, such as acetic acid, propionic acid, butyric acid, and the like, with substituted aliphatic carboxylic acids such as lactic acid and the like, or with aromatic carboxylic acids such as benzoic acid and preferably its hydroxy, methoxy, benzyloxy, halogen, or lower alkyl substituted derivatives yields the corresponding N-acyl compounds.

Another embodiment of the process according to the present invention consists in reacting the starting benzofuran-3-propionic acids according to the Schmidt reaction with hydrazoic acid in sulfuric acid solution. Thereby, the resulting azide decomposes and is rearranged under the influence of the mineral acid to the corresponding 3-($\beta$-aminoethyl)benzofuran compound whereby carbon dioxide is split off. Said amino compound is obtained in the form of its sulfate. The free base can be isolated therefrom by reaction with an alkali metal hydroxide solution. The base can also be converted into the corresponding 3-($\beta$-acylaminoethyl)benzofuran compounds by reaction with the above mentioned carboxylic acids.

Another process of producing the new and valuable 3-($\beta$-aminoethyl)benzofuran compounds according to the present invention consists in converting a reactive derivative of a corresponding benzofuran-3-carboxylic acid, such as its acid chloride into the corresponding aliphatic acid amide, for instance, by reacting with dimethylamine which yields the corresponding dimethylamide. Said reaction is preferably carried out in a neutral organic solvent at elevated temperature and the hydrogen chloride split off thereby is combined with an acid binding agent, preferably with an excess of the amine used.

The acid amide may also be obtained by reacting a lower alkyl ester, for instance, the ethyl ester of a corresponding benzofuran-3-carboxylic acid with an aliphatic amine such as dimethylamine, whereby the corresponding acid dimethylamide is formed and can be isolated in a good yield.

The resulting tertiary amide of the respective benzofuran-3-carboxylic acid, and preferably its dimethylamide is then reduced by means of a suitable reducing agent, for instance, with lithium aluminum hydride in a suitable solvent such as dioxane or tetrahydrofuran, preferably at elevated temperature. Thereby, the corresponding 3-dimethylaminomethyl benzofuran is obtained in an excellent yield after working up the reaction mixture in a manner known per se. Subsequent quaternization of said 3-dimethylaminomethyl benzofuran by reaction with an alkyl halogenide, preferably methyl iodide and working up the reaction mixture in a manner known per se yields the corresponding 3-dimethylaminobenzofuran methoiodide. This compound is then reacted with a metal cyanide, for instance, with sodium cyanide in a strongly polar, high boiling solvent such as dimethyl formamide at a temperature between about 100° C. and about 150° C. whereby the quaternary ammonium group is eliminated and the corresponding 3-cyanomethylbenzofuran is obtained and isolated. The resulting nitrile is reduced by means of a suitable reducing agent such as a lithium aluminum hydride in an anhydrous solvent, for instance, in ether in a manner known per se to the corresponding 3-(β-aminoethyl)benzofuran which is isolated preferably in the form of its salt, such as the hydrochloride. The free base can also be reacted with an aliphatic carboxylic acid having 1 to 5 carbon atoms which may be substituted, such as acetic acid, propionic acid, butyric acid, carbonic acid, or their lower alkyl esters, or with an aromatic carboxylic acid which may be substituted such as benzoic acid, or its amino, halogeno, or methoxy derivatives, or with phthalic acid in a manner known per se to yield the corresponding 3-(β-acylaminoethyl)benzofuran compounds.

If the resulting 3-(β-acylaminoethyl)benzofuran contains in 5-position a benzyloxy group, the benzyl group may be removed, if desired, by reduction with palladium and hydrogen in a suitable solvent such as methanol whereby the corresponding 5-hydroxy-3-(β-acylaminoethyl)benzofuran which contains a free hydroxyl group is obtained.

It is, of course, also possible to carry out the above described catalytic debenzylation at any suitable reaction step or with any hereinabove described intermediate product and to subject the corresponding 5-hydroxybenzofuran-3-derivative to further reaciton steps as mentioned hereinabove.

The compounds obtained according to the present invention possess valuable pharmacological properties. Especially high sedative action is exhibited, for instance, by the compounds obtained according to the following Examples 3, 6, and 7, anticonvulsant and sedative activity is shown in mice by the products of Examples 19, 20, 21, and 27. Stimulating and blood pressure increasing products are obtained when proceeding according to Examples 5 and 29. The product of Example 13 has a high stimulating effect. The new compounds thus represent valuable new pharmaceutical products of comparatively low toxicity.

The following examples serve to illustrate the present invention without, however, limiting the same thereto.

EXAMPLE 1

β-(5-methoxybenzofuran-3)-propionic acid methyl ester 13.8 g. (0.0627 mole) of β-(5-methoxybenzofuran-3)-propionic acid are heated under reflux in 190 ml. of methanol for six hours. In the first three hours gaseous hydrochloric acid is passed into the mixture. Excess methanol is distilled off. The residue is poured into water, neutralized by the addition of sodium carbonate, and extracted with ether. After drying, the ether is evaporated. The resulting ester is recrystallized from methanol. The yield is 86% of the theoretical yield. Melting point: 51–52° C.

EXAMPLE 2

β-(5-methoxybenzofuran-3)-propionic acid hydrazide

The hydrazide is prepared by heating 12.6 g. (0.053 mole) of the methyl ester obtained according to Example 1 with 21 ml. of 80% hydrazine hydrate in 100 ml. of ethanol on a water bath for one and a half hours. The solution is evaporated to dryness and the residue is recrystallized from methanol. The yield is 11 g. corresponding to 88% of the theoretical yield. Melting point: 114–115° C.

EXAMPLE 3

β-(5-methoxy benzofuran-3)-propionic acid azide and 3-(β-aminoethyl)-5-methoxybenzofuran-N-carboxylic acid methyl ester 23 g. (0.098 mole) of the reaction product obtained according to Example 2 are dissolved in dilute acetic acid (prepared from 294 ml. of water and 112 ml. of glacial acetic acid). 162 ml. of benzene are added and the mixture is cooled to 0° C. A solution of 7.2 g. (0.104 mole) of sodium nitrite in 80 ml. of water is added thereto within three minutes while stirring. The stirring is continued for 30 minutes. The benzene layer is removed and the aqueous layer is extracted with benzene. The combined benzene solutions are washed with water and dilute sodium bicarbonate solution and dried. The dried benzene solution containing the azide is added drop by drop to 1700 ml. of absolute methanol, heated to about 60° C. A methanol-benzene mixture is distilled off by means of a fractionating column at 58–59° C. The remaining solution is evaporated to dryness and the resulting residue is recrystallized from methanol. The yield is 14.2 g. corresponding to 58% of the theoretical yield. Melting point: 142–143° C.

EXAMPLE 4

3-(β-phthalimidoethyl)-5-methoxybenzofuran 14.2 g. (0.057 mole) of 3-(β-aminoethyl)-5-methoxybenzofuran-N-carboxylic acid methyl ester are heated with 14.8 g. (0.1 mole) of phthalic acid anhydride in a salt bath at 230–235° C. for 110 minutes. The cooled mixture is triturated with sodium bicarbonate in a mortar. The residue is filtered off by suction and recrystallized from ethanol. The yield is 15.2 g. corresponding to 83% of the theoretical yield. Melting point: 142–143° C.

EXAMPLE 5

3-(β-amino ethyl)-5-methoxybenzofuran hydrochloride 15.2 g. (0.0473 mole) of the phthalimide compound of Example 4 are heated to boiling in 140 ml. of 96% ethanol with 3 g. (0.0467 mole) of 80% hydrazine hydrate on a boiling water bath for two hours and 45 minutes. After cooling, the mixture is acidified by the addition of concentrated hydrochloric acid to a pH of 2.0. The precipitated phthalic acid hydrazide is filtered off by suction and the filtrate is concentrated by evaporation to a volume of about 20 ml. The concentrated filtrate is diluted with 140 ml. of water, filtered to yield a clear solution, and evaporated again. The residue is recrystallized from a mixture of absolute ethanol and ether. The yield of the amine hydrochloride is 9.1 g. corresponding to 85% of the theoretical yield. Melting point: 165° C.–165° C.

EXAMPLE 6

3-(β-acetylaminoethyl)-5-methoxy benzofuran

A layer of ether is poured over 7.0 g. (0.0308 mole) of the amine hydrochloride of Example 5. Dilute sodium carbonate solution is added thereto and the mixture is stirred. Thereafter, the ether phase, containing the free amine, is separated, dried, and evaporated. 30 g. of acetic acid anhydride are poured over the oily residue (5.2 g.) under nitrogen whereby the temperature increases. After allowing the mixture to stand 12 hours, it is cooled with ice. 200 ml. of water are added and the mixture is stirred until excess of acetic acid anhydride is decomposed. The solution is then adjusted to a pH of 5.0 by the addition of 20 g. of sodium carbonate and the precipitate is filtered off by suction. The precipitate is dissolved in acetic acid ethyl ester and the solution is washed with 2 N hydrochloric acid to remove unreacted amine. After evaporation of the acetic acid ethyl ester, the remaining residue is recrystallized from methanol. The acetyl compound has a melting point of 117–118° C. The yield is 3 g. corresponding to 42% of the theoretical yield.

EXAMPLE 7

3-(β-aminoethyl)-5-methoxybenzofuran-N-carboxylic acid ethyl ester

In analogous manner as described in Example 3, 11.5 g. (0.0491 mole) of the hydrazide of Example 2 are converted with 56 ml. of glacial acetic acid, 147 ml. of water, 81 ml. of benzene, 3.6 g. (0.052 mole) of sodium nitrite in 40 ml. of water, and 900 ml. of absolute ethanol into the above mentioned ethyl urethane compound which is purified by chromatographic treatment in benzene solution on neutral aluminum oxide. The yield is 5.6 g. corresponding to 43% of the theoretical yield. Melting point: 46–47° C.

EXAMPLE 8

5-benxyloxy benzofuran-3-carboxylic acid dimethylamide 8.0 g. (0.03 mole) of 5-benzyloxy benzofuran-3-carboxylic acid are converted into the acid chloride by heating under reflux in 125 ml. of absolute benzene with 7.2 g. (0.05 mole) of thionyl chloride and 1 ml. of dimethyl formamide for two hours. Thereafter, the resulting acid chloride is separated from the solvent, excess of thionylchloride is removed by distillation, and the acid chloride is suspended in 150 ml. of absolute ether. While cooling with ice and stirring, a solution of dimethylamine in absolute ether (prepared from 25 g. (0.3 mole) of dimethylamine hydrochloride) is slowly added thereto and the mixture is stirred at room temperature for two hours. To isolate the dimethylamide, the ethereal mixture is washed with 80 ml. of water and dried and the ether is evaporated. The residue is recrystallized from methanol. The yield is 7 g. corresponding to 79% of the theoretical yield. Melting point: 98–99° C.

EXAMPLE 9

3-dimethylaminomethyl-5-benzyloxy benzofuran

A suspension of 6.1 g. (0.16 mole) of lithium aluminum hydride in 300 ml. of absolute dioxane is stirred at 90° C. in a three-necked flask, provided with stirrer, reflux condenser, and dropping funnel, while a solution of 15.3 g. (0.052 mole) of 5-benzyloxy benzofuran-3-carboxylic acid dimethylamide in 100 ml. of absolute dioxane is added drop by drop thereto within one hour. Stirring and heating of the mixture is continued for 10 hours. The reaction mixture is allowed to stand at 20° C. for 12 hours. Excess reducing agent is decomposed carefully by the addition of water while stirring and in a nitrogen atmosphere. Precipitated inorganic products are filtered off by suction and the filtrate is evaporated to dryness. The residue (12.9 g.) is used as the starting material in Example 10 without further purification. The yield is 86% of the theoretical yield.

EXAMPLE 10

3-dimethylaminomethyl-5-benzyloxy benzofuran methoiodide

The crude reduction product obtained according to Example 9 is diluted with a small quantity of absolute ether and is added slowly drop by drop to a solution of 10.7 g. (0.075 mole) of methyl iodide in about 20 ml. of absolute ether while cooling with water and stirring. The mixture is allowed to stand overnight. Precipitated methoiodide is filtered off by suction. The yield is 13.2 g. corresponding to 68% of the theoretical yield. Melting point: 202–203° C. The product is recrystallized from methanol for analysis.

EXAMPLE 11

3-cyanomethyl-5-benzyloxy furan 20.3 g. (0.048 mole) of the quaternary salt obtained according to Example 10 is heated with 10 g. of sodium cyanide in 200 ml. of dimethyl formamide at 140–150° C. for 3 hours. After cooling, the reaction mixture is poured into water and extracted with acetic acid ethyl ester. After evaporation of the acetic acid ethyl ester, a residue remains, which is recrystallized from ethanol. The yield is 7.5 g. corresponding to 59% of the theoretical yield. Melting point: 133–134° C.

EXAMPLE 12

3-(β-aminoethyl)-5-benzyloxy benzofuran hydrochloride

A suspension of 5 g. (0.132 mole) of lithium aluminum hydride in about 200 ml. of absolute ether is placed in a three-necked flask provided with stirrer, dropping funnel, and reflux condenser and closed by a sodium-carbonate-lime tube. A solution of 9.2 g. (0.035 mole) of the compound obtained according to Example 11 in 200 ml. of absolute ether is added drop by drop thereto at 20° C. while stirring. To complete the reaction, the mixture is boiled under reflux for 4 hours. After cooling, excess reducing agent is carefully decomposed by the addition of water in a nitrogen atmosphere. The undissolved inorganic product is filtered off by suction and the filtrate evaporated to dryness. The residue is dissolved in absolute benzene. Anhydrous alcoholic hydrochloric acid is added to adjust the pH value of the solution to a pH of 3.0. The precipitated hydrochloride is filtered off by suction and is recrystallized from a mixture of ethanol and ether. The yield is 7.8 g. corresponding to 73% of the theoretical yield. Melting point: 253–254° C.

EXAMPLE 13

3-(β-aminoethyl)-5-hydroxybenzofuran hydrochloride 9.6 g. (0.0317 mole) of the reaction product obtained according to Example 12 are hydrogenated in 360 ml. of methanol with the addition of 4 g. of 5% palladium deposited on charcoal at 20° C. and atmospheric pressure. All in all 900 ml. of hydrogen (780 ml. are theoretically required) are absorbed within two hours. The hydrogenation product is recovered by filtering off the catalyst by suction and recrystallization from a mixture of ethanol and ether. Melting point: 227–228° C. The yield is 5.9 g. corresponding to 87% of the theoretical yield.

EXAMPLE 14

2-methyl-5-benzyloxy benzofuran-3-carboxylic acid dimethylamide

By proceeding according to Example 8 the acid chloride of 2-methyl-5-benzyloxy benzofuran-3-carboxylic acid is obtained by treating 40.5 g. (0.1436 mole) of 2-methyl-5-benzyloxy benzofuran-3-carboxylic acid with 30 ml. of thionylchloride and 2 ml. of dimethyl formamide in 400 ml. of absolute benzene. Reacting said acid chloride with a dimethylamine solution in absolute ether prepared from 100 g. (1.2 moles) of dimethylamine hydrochloride yields the above mentioned dimethylamide. On recrystallization from methanol, the yield is 42 g. corresponding to 94% of the theoretical yield. Melting point: 89–90° C.

EXAMPLE 15

2-methyl-3-dimethylaminomethyl-5-benzyloxy benzofuran

By proceeding according to Example 9 the corresponding amine is prepared by reacting 20 g. (0.0647 mole) of 2-methyl-5-benzyloxy benzofuran-3-carboxylic acid dimethylamide (obtained according to Example 14) with 7.6 g. (0.2 mole) of lithium aluminum hydride in 500 ml. of absolute dioxane. It is obtained in the form of an oil. The yield is 17.8 g. corresponding to 93% of the theoretical yield.

EXAMPLE 16

2-methyl-3-dimethylaminomethyl-5-benzyloxy benzofuran methoiodide

This compound is prepared by proceeding according to Example 10 and reacting 9.8 g. (0.0332 mole) of the base obtained according to Example 15 with 6.0 g. (0.042 mole) of methyl iodide in 50 ml. of absolute ether. The methoiodide is recrystallized from methanol. Melting point: 213–214° C. The yield is 12.8 g. corresponding to 82% of the theoretical yield.

EXAMPLE 17

2-methyl-3-cyanomethyl-5-benzyloxy benzofuran

By proceeding as described in Example 11, the above mentioned nitrile is prepared by reacting 30 g. (0.0686 mole) of the quaternary salt of Example 16 with 13.4 g. (0.273 mole) of sodium cyanide in 180 ml. of dimethyl formamide at 140–150° C. for 4 hours. It is recrystallized from methanol. Melting point: 90–91° C. The yield is 15.5 g. corresponding to 81% of the theoretical yield.

EXAMPLE 18

2-methyl-3-(β-aminoethyl)-5-benzyloxy benzofuran hydrochloride

Reduction is carried out as described in Example 12. The amine hydrochloride is prepared by reducing 14.0 g. (0.0505 mole) of the nitrile of Example 17 with 5.5 g. (0.145 mole) of lithium aluminum hydride in 600 ml. of absolute ether. After working up the reduction mixture, the benzene solution of the amine is treated with alcoholic hydrochloric acid and the resulting hydrochloride is recrystallized from a mixture of ethanol and ether. The yield is 10.2 g. corresponding to 63% of the theoretical yield. The resulting amine hydrochloride has a melting point of 229–230° C.

EXAMPLE 19

2-methyl-3-(β-aminoethyl)-5-hydroxybenzofuran hydrochloride 7.0 g. (0.022 mole) of the amine hydrochloride of Example 18 is debenzylated (as described in Example 13) by hydrogenation in the presence of 3.5 g. of 5% palladium deposited on charcoal in 250 ml. of methanol. 550 ml. of hydrogen are adsorbed and the above mentioned compound is isolated and recrystallized from methanol. The yield is 4 g. corresponding to 80% of the theoretical yield. Melting point: 264–265° C.

EXAMPLE 20

2-methyl-5-benzyloxy-3-(β-N-carbethoxy aminoethyl) benzofuran 7.7 g. (0.0242 mole) of the amine hydrochloride obtained according to Example 18 are dissolved in 150 ml. of benzene. 4.9 g. (0.0484 mole) of triethylamine are added to said solution while cooling with ice. A benzene solution of 2.6 g. (0.024 mole) of chlorocarbonic acid ethyl ester is added drop by drop thereto while stirring. The reaction mixture is allowed to stand at a temperature of +5° C. to +8° C. for one hour while stirring and is then poured into water. The benzene phase is separated, dried, and concentrated by evaporation. The resulting residue is recrystallized from a mixture of cyclohexane and petroleum ether. The yield of the urethane is 3.5 g. corresponding to 41% of the theoretical yield. Melting point: 79–80° C.

EXAMPLE 21

2-methyl-5-benzyloxy-3-(β-N-acetylaminoethyl) benzofuran 23 g. (0.082 mole) of the base of Example 18 and 82 g. (0.8 mole) of acetic acid anhydride are mixed, whereby the temperature of the mixture increases. After reaction has ceased, the reaction mixture is heated at 80–90° C. for one hour and is allowed to stand at room temperature overnight. For further working up, the reaction mixture is cooled and 230 ml. of water are added thereto while stirring. The resulting precipitate is filtered off by suction and dissolved in acetic acid ethyl ester. The solution is washed with 2 N hydrochloric acid and is dried. After evaporation to dryness a crude product is obtained, which is recrystallized from methanol, yielding the above mentioned acetylamino compound of the melting point of 115–116° C. The yield is 10.7 g. corresponding to 40% of the theoretical yield.

EXAMPLE 22

2-methyl-5-hydroxy-3-(β-N-acetylaminoethyl) benzofuran 6.0 g. (0.0185 mole) of the acetylation product of Example 21 are dissolved in 200 ml. of methanol and are hydrogenated with the addition of 3 g. of 5% palladium deposited on charcoal by means of hydrogen at room temperature and atmospheric pressure within 6 hours. 460 ml. of hydrogen are absorbed. The catalyst is separated by filtration. The methanol solution is concentrated by evaporation. The resulting hydrogenation product is recrystallized from the same solvent. Melting point: 179–180° C. The yield is 3.8 g. corresponding to 88% of the theoretical yield.

EXAMPLE 23

2-methyl-5-methoxybenzofuran-3-carboxylic acid dimethylamide

The corresponding acid chloride is prepared by reacting 20.0 g. (0.097 mole) of 2-methyl-5-methoxybenzofuran-3-carboxylic acid and 19.0 g. of thionylchloride, in 300 ml. of absolute benzene with 2 ml. of dimethyl formamide by proceeding as described in Example 8. This compound is converted into the above named acid amide by reaction with dimethylamine (prepared from 65 g. of dimethylamine hydrochloride) in a solution of absolute ether. The yield is 15.1 g. corresponding to 67% of the theoretical yield. Boiling point: 142–144° C./0.4 mm. Hg.

EXAMPLE 24

2-methyl-3-dimethylaminomethyl-5-methoxybenzofuran methoiodide

Reduction of 15.0 g. (0.0643 mole) of the acid amide of Example 23 by means of 8 g. (0.21 mole) of lithium aluminum hydride in 700 ml. of absolute dioxane according to Example 9 yields 13.8 g. of 2-methyl-3-dimethylaminoethyl-5-methoxybenzofuran in the form of an oil. By proceeding according to Example 10, this compound is converted into the quaternary salt by reaction with 14.2 g. (0.1 mole) of methyl iodide in 18 ml. of absolute ether. The salt is recrystallized from methanol. Melting point: 224° C. The yield is 16 g. corresponding to 69% of the starting dimethylamide.

EXAMPLE 25

2-methyl-3-cyanomethyl-5-methoxybenzofuran 14.8 g. (0.041 mole) of the methoiodide of Example 24 are heated under reflux with 8.4 g. (0.18 mole) of sodium cyanide in 100 ml. of dimethyl formamide for 4 hours. After cooling, the mixture is poured in water, whereby part of the resulting nitrile precipitates and is filtered off. The filtrate is extracted with acetic acid ethyl ester and is evaporated to dryness. The residue is recrystallized from a small quantity of methanol together with the above mentioned precipitate. Melting point: 97–97.5° C. The yield is 6.1 g. corresponding to 74% of the theoretical yield.

EXAMPLE 26

2-methyl-3-(β-aminoethyl)-5-methoxybenzofuran-hydrochloride 10.6 g. (0.0528 mole) of the nitrile of Example 24 are reduced by means of 6 g. (0.158 mole) of lithium aluminum hydride in 550 ml. of absolute ether to the above named amine hydrochloride by proceeding according to Example 12. The resulting compound is recrystallized from a mixture of absolute ethanol and ether. Melting point: 253–254° C. The yield is 6.4 g. corresponding to 50% of the theoretical yield.

EXAMPLE 27

2-methyl-3-(β-N-acetylaminoethyl)-5-methoxybenzofuran 16.2 g. (0.08 mole) of 2-methyl-3-cyanomethyl-5-methoxybenzofuran are reduced by means of lithium aluminum hydride by following the procedure described hereinabove in Example 26. The resulting base is acylated with 60 g. of acetic acid anhydride in a nitrogen atmosphere as described in Example 2. The crude N-acetyl compound is recrystallized from benzene. Melting point: 138–139° C. The yield is 10.4 g. corresponding to 52.5% of the theoretical yield.

EXAMPLE 28

2-methyl-5-hydroxy-3-(N-carbethoxy-β-aminoethyl)benzofuran 6.8 g. (0.01925 mole) of 2-methyl-5-benzyloxy-3-(β-N-carbethoxyaminoethyl)benzofuran are hydrogenated with the addition of 3 g. of 5% palladium deposited on charcoal in 200 ml. of methanol by following the procedure as described in Example 22, thereby yielding the above named product. Hydrogen absorption amounts to 475 ml. The hydrogenation product is recrystallized from benzene. Melting point: 90–91° C. The yield is 2.8 g. corresponding to 55% of the theoretical yield.

EXAMPLE 29

3-(β-aminoethyl)benzofuranhydrochloride

A solution of 12.0 g. (0.316 mole) of lithium aluminum hydride in about 300 ml. of absolute dioxane is heated under reflux while sttirring. A solution of 6.0 g. (0.0342 mole) of benzofuran-3-acetic acid amide in about 300 ml. of absolute dioxane is added thereto within one hour while stirring. Heating to boiling is continued for 15 more hours. Moist dioxane is carefully added to the cooled reaction solution in a nitrogen atmosphere. The inorganic precipitate is filtered off by suction. The filtrate is dried and the dioxane is evaporated. The residue is dissolved in absolute ether, treated with animal charcoal, and absolute ethanolic hydrochloric acid is added to the clear filtrate. Thereby, the hydrochloride of the 3-β-aminoethyl-benzofuran precipitates. The precipitate is filtered off by suction and is recrystallized from a mixture of absolute ethanol and ether. Melting point: 189–190° C. The yield is 1.07 g. corresponding to 16% of the theoretical yield.

EXAMPLE 30

3-(β-N-carbethoxyaminoethyl)-5-benzyloxybenzofuran 14.3 g. (0.0472 mole) of 3-(β-aminoethyl)-5-benzyloxy benzofuran hydrochloride obtained according to Example 12 are vigorously stirred with 7.7 g. (0.071 mole) of chlorocarbonic acid ethylester, 9.1 g. (0.086 mole) of sodium carbonate, and 100 ml. of water at a temperature of 0° C. for one hour. The resulting reaction product is filtered off by suction, dissolved in benzene, and the benzene solution is shaken with 2 N hydrochloric acid. The benzene is evaporated and the residue is recrystallized from cyclohexane. Melting point: 97–98° C. The yield is 12.0 g. corresponding to 75% of the theoretical yield.

EXAMPLE 31

3-(β-N-acetylaminoethyl)-5-benzyloxybenzofuran 14.4 g. (0.0475 mole) of 3-(β-aminoethyl)-5-benzyloxybenzofuran hydrochloride of Example 12 are treated with an aqueous sodium carbonate solution covered by a benzene layer with stirring, thereby forming the free amine. The benzene solution is dried and evaporated. 15 ml. of glacial acetic acid are added in portions to the residue while heating the mixture gently on the water bath. 15 ml. of acetic acid anhydride are then added and the mixture is heated on the boiling water bath for 45 minutes. Excess acid is evaporated by distillation in a vacuum. The residue is recrystallized twice from benzene. Melting point: 135–136° C. The yield is 11.9 g. corresponding to 81% of the theoretical yield.

EXAMPLE 32

3-(β-N-carbethoxyaminoethyl)-5-hydroxybenzofuran 7.0 g. (0.0206 mole) of 3-(β-N-carbethoxyaminoethyl)-5-benzyloxybenzofuran of Example 30 are dissolved in 250 ml. of methanol and hydrogenated at room temperature and under atmospheric pressure with the addition of 4.0 g. of palladium deposited on charcoal (5%). 480 ml. of hydrogen are absorbed within 3 hours. The catalyst is filtered off by suction and the filtrate is evaporated to dryness. The reaction product is recrystallized from benzene. Melting point: 106–107° C. The yield is 4.1 g. corresponding to 80% of the theoretical yield.

EXAMPLE 33

3-(β-N-acetylaminoethyl)-5-hydroxybenzofuran 7.0 g. (0.0226 mole) of 3-(β-N-acetylaminoethyl)-5-benzyloxybenzofuran of Example 31 are dissolved in 300 ml. of methanol and hydrogenated at atmospheric pressure and room temperature with the addition of 4.0 g. of 5% palladium deposited on charcoal. 580 ml. of hydrogen are absorbed within one hour. The catalyst is filtered off by suction and the filtrate is evaporated to dryness. The resulting reaction product is recrystallized from a mixture of methanol and water. Melting point: 183–184° C. The yield is 4.4 g. corresponding to 89% of theoretical yield.

EXAMPLE 34

2-methyl-3-(β-N-carbethoxyaminoethyl)-5-methoxybenzofuran

The above mentioned compound is obtained by proceeding according to Example 30 and reacting 11.2 g. (0.0464 mole) of 2-methyl-3-(β-aminoethyl)-5-methoxybenzofuran hydrochloride of Example 26 with 6.85 g. (0.063 mole) of chlorocarbonic acid ethyl ester, 6.7 g. (0.063 mole) of sodium carbonate, and 200 ml. of water; melting point: 73–74.5° C. on recrystallization from cyclohexane. The yield is 11.3 g. corresponding to 88% of the theoretical yield.

Other acid addition salts of the new benzofuran bases than the hydrochlorides may be prepared in a manner known per se whereby, of course, pharmaceutically acceptable acids, the salts of which in the doses administered are substantially nontoxic, are employed for making the acid addition salts. Acids which have been used for this purpose are, for instance, inorganic acids such as hydrobromic acid, sulfuric acid, nitric acid, phosphoric acid, or organic acids, such as acetic acid, propionic acid, butyric acid, lactic acid, maleic acid, malonic acid, malic acid, citric acid, tartaric acid, succinic acid, benzoic acid, salicylic acid, phthalic acid, nicotinic acid and the like.

The new compounds and their acid addition salts, are preferably administered orally in the form of tablets, pills, powders, capsules, solutions, emulsions, suspensions, dispersions, and in any other suitable form. They are preferably not used as such, but are diluted with suitable diluting agents, thus, allowing better and more economical use to be made thereof.

In the case of powders, fine, uniform dispersion of the new compounds within the diluting agent is of importance. Such a fine dispersion can be achieved, for instance, by mixing and milling the new compounds with a solid, pulverulent extending agent to the desired fineness, or by impregnating the already milled, finely powdered, solid carrier with a solution of the active compound in water, or a water-miscible solvent and then removing the water or solvent.

As solid carriers which are suitable for the manufacture of useful pharmaceutical preparations, various inert pulverulent distributing agents as they are conventionally used in pharmaceutical compounding may be employed.

When preparing tablets, pills, powders, and the like, the commonly diluting agents, binders, lubricants, and the like are added, such as sugar, lactose, talcum, starch, pectins; as binders gelatin, gum arabic, methyl cellulose, yeast extract, agar, tragacanth; and as lubricating agents, magnesium stearate, stearic acid, and others.

The new compounds may, of course, also be administered parenterally, for instance, by intravenous of intramuscular injection. For this purpose aqueous of saline solutions, especially of their water soluble acid addition salts, or suspensions therein may be used.

Rectal application in the form of conventional suppositories is also possible.

Of course, many changes and variations in the starting materials, in the reaction conditions, temperature, duration, solvents used, catalysts employed, in the methods of working up the reaction mixture and of purifying the benzofuran compounds and their acid addition salts, and the like may be made by those skilled in the art in accordance with the principles set forth herein and in the claims annexed hereto.

We claim:
1. 3-($\beta$-aminoethyl)-5-methoxybenzofuran.
2. The hydrochloride of 3-($\beta$-aminoethyl)-5-methoxybenzofuran.
3. 3-($\beta$-acetylaminoethyl)-5-methoxybenzofuran.
4. 3-($\beta$-aminoethyl)-5-hydroxybenzofuran.
5. 3 - ($\beta$-aminoethyl)-5-hydroxybenzofuran hydrochloride.
6. 2-methyl-3-($\beta$-aminoethyl)-5-hydroxybenzofuran.
7. 2 - methyl-3-($\beta$ - aminoethyl)-5-hydroxybenzofuran hydrochloride.
8. 2 - methyl-3-($\beta$ - N-acetylaminoethyl)-5-hydroxybenzofuran.
9. 2 - methyl-3-($\beta$ - aminoethyl)-5-methoxybenzofuran hydrochloride.
10. 2 - methyl-3-($\beta$ - N-acetylaminoethyl)-5-methoxybenzofuran.
11. 3 - ($\beta$ - aminoethyl)benzofuran hydrochloride.
12. 3 - ($\beta$ - N-acetylaminoethyl)-5-hydroxybenzofuran.
13. A 3-substituted benzofuran compound selected from the group consisting of the 3-($\beta$-aminoethyl)benzofuran compound of the formula

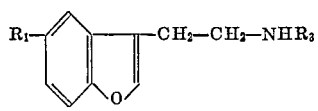

wherein
$R_1$ indicates a member selected from the group consisting of hydrogen, hydroxyl, methoxy, and benzyloxy, and
$R_3$ is hydrogen,
and its pharmaceutically acceptable acid addition salts.
14. 3 - ($\beta$ - aminoethyl)-5-benzyloxy benzofuran hydrochloride.
15. 3-($\beta$-N-acetylaminoethyl)-5-benzyloxy benzofuran.

16. A 3-substituted benzofuran compound selected from the group consisting of the 2-methyl-3-($\beta$-aminoethyl) benzofuran compound of the formula

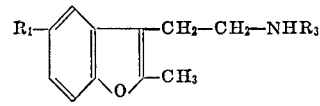

wherein
$R_1$ indicates a member selected from the group consisting of hydrogen, hydroxyl, methoxy, and benzyloxy, and
$R_3$ is hydrogen,
and its pharmaceutically acceptable acid addition salts.
17. 2-methyl-3-($\beta$ - aminoethyl) - 5 - benzyloxy benzofuran hydrochloride.
18. 2 - methyl-3-($\beta$ - N-acetylaminoethyl)-5-benzyloxy benzofuran.
19. 3 - ($\beta$-phthalimidoethyl)-5-methoxybenzofuran.
20. A compound of the formula:

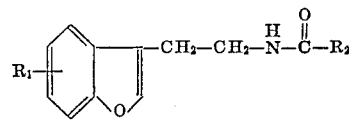

wherein $R_1$ is a member selected from the group consisting of hydrogen, lower alkoxy, lower alkyl, nitro, halogen, and hydroxy and wherein $R_2$ is a member of the group consisting of lower alkyl and hydrogen.
21. A 3-substituted benzofuran compound selected from the group consisting of the 3-($\beta$-aminoethyl)benzofuran compound of the formula

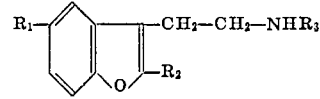

wherein
$R_1$ indicates a radical selected from the following: hydrogen, hydroxyl, lower alkoxy, lower alkyl, benzyloxy, benzyl, benzhydryl, halogen, nitro, amino, lower alkylamino, and benzylamino;
$R_2$ indicates a radical selected from the following: hydrogen, lower alkyl, and phenyl; and
$R_3$ indicates a radical selected from the following: hydrogen lower alkanoyl and benzoyl;
and its pharmaceutically acceptable acid addition salts.
22. A compound of claim 21 in which $R_3$ is acetyl.
23. The compound of the formula

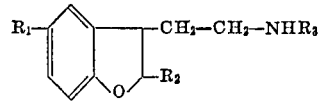

in which $R_1$ is benzyloxy, $R_2$ is lower alkyl and phenyl and $R_3$ is lower alkanoyl, benzoyl, and hydrogen.
24. A compound of the formula of claim 21 in which $R_1$ is benzyloxy.
25. A compound of the formula of claim 21 in which $R_2$ is phenyl.

References Cited
UNITED STATES PATENTS 3,070,606 12/1962 Anderson et al. ____ 260—346.2
3,033,875 5/1962 Notting et al. ____ 260—346.2

OTHER REFERENCES

Banziger et. al.: J. Amer. Pharm. Assoc., vol. 44 (1955), pages 302–5.

HENRY R. JILES, *Primary Examiner.*